US005846624A

United States Patent [19]
Denklau et al.

[11] Patent Number: 5,846,624

[45] Date of Patent: Dec. 8, 1998

[54] DUAL FACE PRESSURE SENSITIVE LABEL

[75] Inventors: Michael D. Denklau, Lisle; Gerard J. Maynard, Barrington, both of Ill.

[73] Assignee: The Standard Register Company, Dayton, Ohio

[21] Appl. No.: 761,706

[22] Filed: Dec. 6, 1996

[51] Int. Cl.[6] .......... B32B 3/06

[52] U.S. Cl. .......... 428/42.3; 428/43; 283/81

[58] Field of Search .......... 428/42.3, 43, 78; 283/81; 281/2, 5

[56] References Cited

U.S. PATENT DOCUMENTS

| | | |
|---|---|---|
| Re. 33,616 | 6/1991 | Welsch . |
| 4,627,994 | 12/1986 | Welsch . |
| 4,696,843 | 9/1987 | Schmidt . |
| 5,348,780 | 9/1994 | Boggs et al. . |

*Primary Examiner*—Alexander Thomas
*Attorney, Agent, or Firm*—Killworth, Gottman, Hagan & Schaeff, L.L.P.

[57] ABSTRACT

A business form including a unitary sheet of release liner extending in a longitudinal direction and on one face defining adjacent first and second sides parallel to one another along the longitudinal direction. A continuous first label ply is removably adhered by a first adhesive to the first side of the release liner and includes die cuts defining removable labels. A continuous second label ply is removably adhered by a second adhesive to the second side of the release liner and is made of a different material than the first ply and has die cuts therein to define removable labels. A method of making such a form is also disclosed, including the steps of a) providing a continuous release liner as described, b) releasably adhering a continuous first label ply onto the first side of the liner release face, c) applying an adhesive to a face of a continuous second label ply which is a different material than the first label ply, d) bringing the continuous second label ply into contact with the second side of the liner release face whereby the adhesive releasably adheres the liner and second label ply together, and e) die cutting labels in both the first and second label plies.

14 Claims, 1 Drawing Sheet

DUAL FACE PRESSURE SENSITIVE LABEL

BACKGROUND OF THE INVENTION

1. Technical Field

The present invention is directed toward business forms having pressure sensitive labels and more particularly toward business forms having a plurality of pressure sensitive labels made of different materials 2. Background Art Many situations require non-paper labels for various applications. These non-paper, or synthetic, labels are usually constructed of plastic material and are used for their durability and ability to withstand rugged conditions better than paper labels.

In some situations, both paper and synthetic labels are used. For example, appliances often have a UL listed rating plate label and a bar coded product identification label affixed to them. The UL listed rating plate label is preferably a synthetic label so that this label can last the life of the appliance, while the bar coded product is a paper label to be removed once the appliance is purchased. Combining synthetic and paper label faces on the same business form is old in the art and generally involve one of two business form structures.

One such business form is known as glue overlap, in which a die cut first face stock is releasably adhered to a first liner, a die cut second face stock is releasably adhered to a second liner, and the first and second liners are secured together by adhering together overlapping portions running the length of the form. Due to the uneven thickness of this construction glue, overlap form cannot be readily used in thermal transfer or laser printing processes. Also, such forms are essentially thicker along the overlap, so that fewer forms can be fit in a carton, thereby increasing storage and shipping costs. Further, since forming glue overlap business forms involves joining two separate face stock materials to two separate liners using two separate adhesives, and then overlapping and adhering the liners together, they involve a relatively costly multi-step manufacturing process. Still further, the adhesive joining the liners of glue overlap business forms may, over time and with exposure to a variety of environmental conditions, lose its adhesive properties, separate, or tear. Replacing such ruined forms wastes resources and adds to production costs.

Another prior art business form structure which has incorporated labels of differing materials is a "tipped" mixed face label form, in which a paper label ply is adhered to a release liner and separate and discrete labels of a synthetic material are adhered to the form by tipping. A form of this type is shown, for example, in U.S. Pat. No. 5,348,780.

Typically, tipping applicators hold a label on the tip of an arm and then move (tip) the label into position at an appropriate location on top of the release liner. Unfortunately, tipping can slow the manufacturing process and thereby increase its cost. Further, precise application of labels by tipping is difficult so that relatively large tolerances must be allowed for, with the result being that subsequent printing on such labels can be somewhat sloppy (for example, individualized printing to fill in blanks on the label will end up with the printing being misaligned on some labels due to the different shifted positions of the labels). Moreover, since most printers will be set to print across specific lines on the form, if the tipped label is beside a paper label but is not precisely aligned, one of the two labels will inevitably be printed with information which is out of alignment. Further, since the synthetic labels are typically intended to be adhered to a product for a long period of time, "sloppy" printing in this manner on the label can wrongly and for a long period of time give the impression that production of the product itself might also have been sloppy. Such a commercial impression could have obvious negative effects on the future sales of the product.

Also, with many forms having this second type of prior art structure, labels are die cut in the paper ply and the excess removed from the liner to expose selected gaps on the liner onto which synthetic labels are tipped in a manner such as described above. With such structures, however, there is a tremendous amount of waste, as the removed and discarded portions of the paper ply are not merely small "ladder" matrix portions between die cut labels, but also include larger patches of material removed from the selected gaps in which the synthetic labels are then applied. Such waste involves not only the paper ply itself, but also the adhesive which is removed from the release liner with the removed portions of the paper ply. Still further, such removed portions tend to be non-uniform (that is, the removed material might be substantially open with a thin "ladder" matrix configuration on one side and closed with the larger patches of removed material on the other. Such a lopsided configuration can make it difficult to reliably remove the material over long periods of time in a continuous manufacturing process.

The present invention is directed toward overcoming one or more of the problems discussed above.

SUMMARY OF THE INVENTION

In one aspect of the present invention, a business form is provided including a unitary sheet of release liner extending in a longitudinal direction and on one flat face defining adjacent first and second sides parallel to one another along the longitudinal direction. A continuous paper first label ply is removably adhered by a first adhesive to the first side of the release liner and includes die cuts defining removable labels. A continuous second label ply is removably adhered by a second adhesive to the second side of the release liner. The second label ply is made of a different material than the first label ply and has die cuts therein to define removable labels.

In a preferred form of this aspect of the present invention, the first and second adhesives are both pressure sensitive adhesives, with the second adhesive being different from the first adhesive and specially adapted for use with the different material of the second label ply. In other preferred forms of this aspect of the present invention, the release liner and the first and second label plies are all transversely separated by perforations or die cuts to define separate individual business forms.

In other preferred forms of this aspect if the present invention, the first label ply may be made of a paper material and the second label ply may be made of a synthetic material, or the plies may be made of different paper materials or of different synthetic materials.

In another aspect of the present invention, a method of making a business form with labels is provided, including the steps of a) providing a continuous release liner having a release face on one face with parallel first and second sides on the face, b) releasably adhering a continuous first label ply onto the first side of the liner release face, c) applying an adhesive to a face of a continuous second label ply which is a different material than the first label ply, d) bringing the continuous second label ply into contact with the second side of the liner release face whereby the adhesive releasably adheres the liner and second label ply together, and e) die cutting labels in both the first and second label plies.

In a preferred form of this aspect of the present invention, the die cutting defines labels inside a matrix of the label plies, and the matrix is then removed from the release liner.

In other preferred forms of this aspect of the present invention, the first ply is adhered to the release liner by applying a second adhesive to either a face of the first label ply or onto the first side of the release liner, and the first label ply is then brought into contact with the first side of the liner release face.

In another preferred form of this aspect of the present invention, the adhesives on the two label plies are different, and the adhesives on each label ply is specially adapted for use with the particular material of that label ply.

In still another aspect of the present invention, a business form is provided which is made according to the above method.

It is an object of the present invention to provide a business form having pressure sensitive labels made of different materials.

It is a further object of the present invention to minimize unused area between the labels on a business form.

It is a still further object of this invention to provide a business form that can be easily, inexpensively, and reliably produced in a single manufacturing process.

Still another object of the present invention to provide a business form which may be used to meet the many different potential label requirements of a business.

Yet another object of the present invention is to provide a business form having labels of different materials which can be reliably and precisely printed on by a variety of different types of printers.

DETAILED DESCRIPTION OF THE PREFERRED EMBODIMENT

Figure 1:
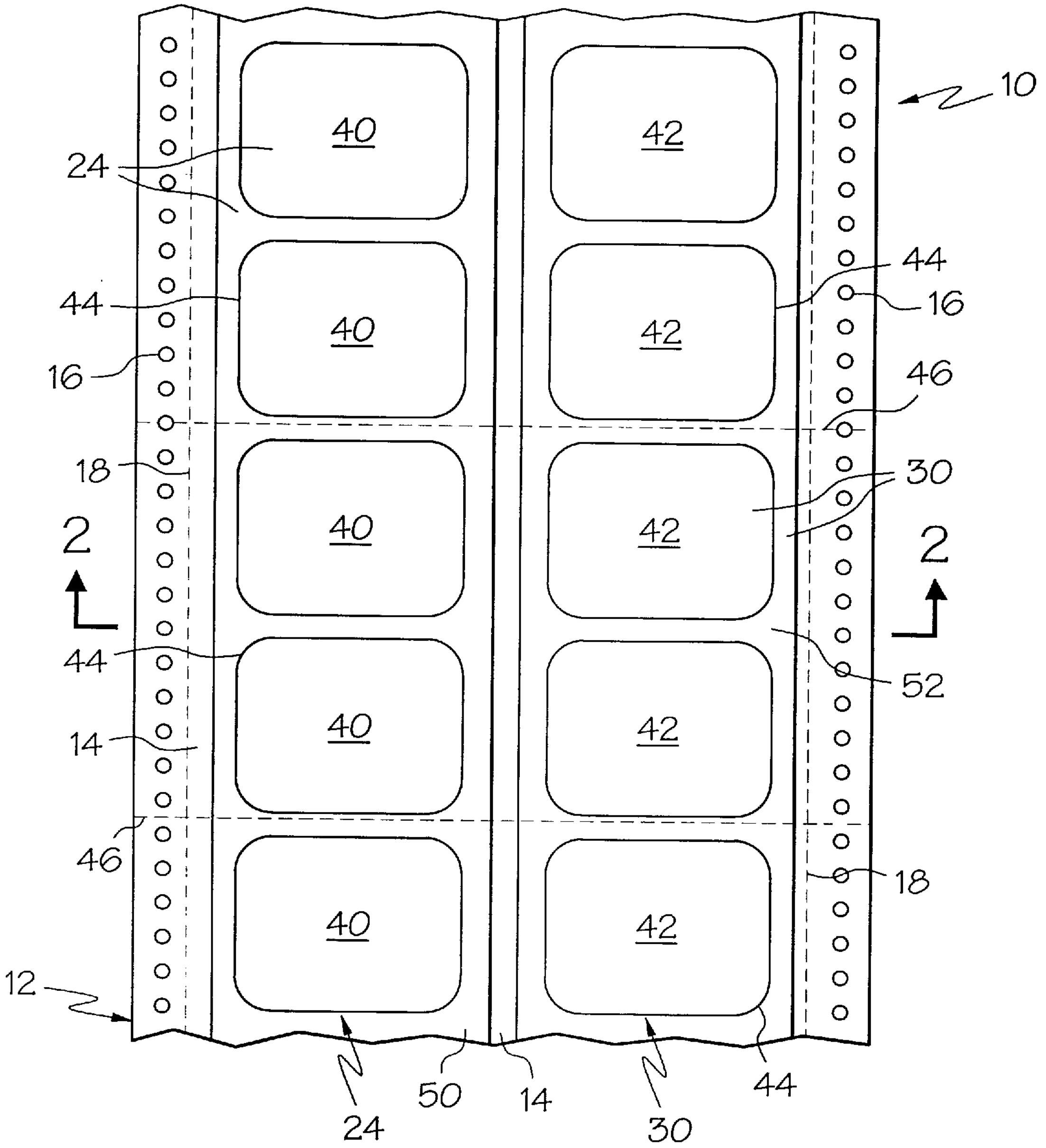
FIG. 1 is a plan view of a business form embodying the preferred embodiment of the present invention.

A business form 10 made according to the present invention is shown in FIG. 1. The business form 10 includes a unitary and continuous ply or web of release liner 12 having a release material on its front face 14. As is generally known in the art, suitable release material should be sufficient to generally adhere to pressure sensitive adhesive but the adhesive will adhere less well to such a material than most other plies of material (such as paper) plies so that two such plies adhered together by the adhesive will allow the plies to be separated without damage and with the adhesive staying with the other ply (the ply not having the release material).

The release liner 12 as shown in the Figures includes control punch margins or tractor feed holes 16 such as can be provided to facilitate feeding of the form 10 during the manufacturing process and/or during final individualized printing by the business user. Longitudinally extending perforations 18 can also be provided as shown to facilitate removal of the margins 16 if desired by the business user of the form. However, it should be understood that forms embodying the present invention could also be made without such holes 16.

Figure 2:
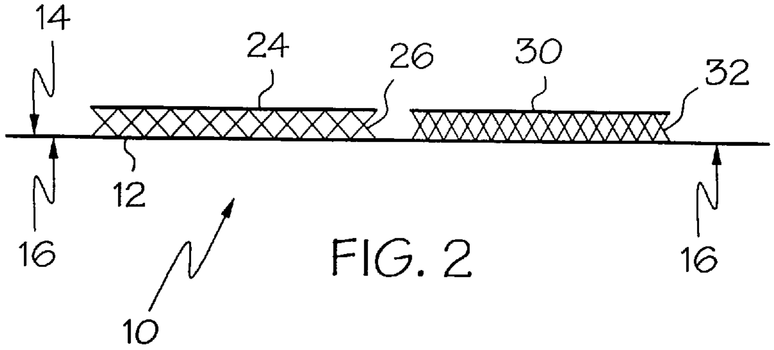
FIG. 2 is a cross-sectional view taken along lines 2—2 of FIG. 1.

Suitably adhered to one side of the release liner front face 14 is a first label ply or face stock 24 made of one type of material. For example, in one preferred structure, the first label ply 24 could be made of a conventional type of face stock such as paper stock. The first label ply 24 is adhered to the release liner 12 by either first applying adhesive 26 (see FIG. 2) to the one side of the release liner front face 14 (by, for example, extruding suitable adhesive through an application slot into a thin layer on that one side of the release liner 12) or by first applying adhesive 26 to the rear face of the first label ply 24 (by, for example, slot coating adhesive onto the rear face of the ply 24), and then bringing the label ply 24 together with the release liner 12 with the adhesive 26 therebetween. The adhesive 26 should be a pressure sensitive adhesive suitable for adhering a label from the label ply 24. For example, with paper labels in normal conditions, hot melt adhesives may be used.

Suitably adhered to the other side of the release liner front face 14 adjacent the first label ply 24 is a second label ply or face stock 30 of a different type of material permitting the business form 10 to carry two different types of labels for very different application. For example, if the first label ply 24 is made of paper, the second label ply 30 may be a synthetic material such as a polyester ply which will be able to withstand much more harsh conditions, and for significantly longer periods of time, than would typical paper labels. Alternatively, the first and second label plies 24, 30 could be made of different types of paper, or of different types of synthetic materials, depending on the desired characteristics of the labels in each ply.

The second label ply 30 is adhered to the release liner 12 by first applying adhesive 32 (see FIG. 2) to the rear face of the second label ply 30, and then bringing the second label ply 30 together with the release liner 12 in the position shown (with only a slight gap from the first label liner 24) with the adhesive 32 between the second label ply 30 and the release liner 24. Alternatively, the second label ply 30 may be separately purchased or made in the form of transfer tape, with a release liner provided over the adhesive 32 on the second label ply 30 (to allow the ply 30 to be rolled for storage and transport without sticking to itself), and the transfer tape release liner is removed during manufacture of the form 10 to expose the adhesive 32 on the second label ply 30 which may then be applied to the release liner 24 of the business form 10.

In another alternative form, the second label ply 30 may be adhered to the release liner 12 in a suitable manner in a position overlapping the first label ply 24, with the double thickness of label ply in the overlapping portion stripped away as waste after die cutting the label plies 24, 30 (discussed below). In this form, there is a space between the die cuts in the two label plies 24, 30 even though there is no such space between the label plies 24, 30 when first adhered to the liner 12. With such an embodiment, the space between the cut labels may be minimized, allowing wider labels and/or narrower form constructions.

The adhesive 32 should be a different pressure sensitive adhesive from the adhesive 26 used with the first label ply 24, and specifically should be suitable for the different application intended of the synthetic labels from the second label ply 30. Suitable adhesives such as might be used for the widely varying different application environments and materials are known in the art. For example, where the labels from the second label ply 30 are intended to be used in high temperature environments, as might commonly occur with labels for use on machinery and equipment, hot melt adhesives such as could be used with the paper labels would not be appropriate and suitable adhesives which do not deteriorate under heat should be used.

Individual labels 40, 42 are formed by die cuts 44 through the label plies 24, 30. Though FIG. 1 shows substantially uniform labels 40, 42, multiple labels 40, 42 of varying, non-uniform size may be cut depending upon the requirements of the business end user. A matrix 50, 52 of scrap is left in each of the label plies 24, 30, which matrix 50, 52 in each is the material outside of the die cuts 44. These matrices 50, 52 may be left on the form 10 to provide a smooth top surface for the form 10, or may alternatively if desired be removed (in the embodiment shown in FIG. 1, the matrices 50, 52 are essentially ladder shaped) to expose the edges of the labels 40, 42 to facilitate their removal from the release liner 12.

The release liner 12 shown in the figures is a continuous sheet with individual forms 10 separated by transverse perforations 46 through the liner 12 and label plies 24, 30. Such perforations 46 permit the form lengths to be easily separated by hand or by a form burster later. Alternatively, the release liner 12 and label plies 24, 30 could be transversely slit or die cut through completely after creating the continuous form as shown in FIG. 1 to provide individual form lengths for handling in cut sheet printers by the business user of the form (for example, in laser printers). In some instances, for example where each label ply 24, 30 has only one label 40, 42 repeated along its length. the liner 12 and plies 24, 30 may not need to be separated at all, and the end user may then just tear off portions of the release liner 12 and discard it as the labels 40, 42 are used up.

The present invention could also be used with business forms having additional plies attached to the release liner where desired. For example, the present invention could be used with a form requiring three different label plies made of three different materials, or with forms having additional plies which are not label plies.

With an understanding of the above, it should be readily apparent that these business forms 10 may be readily adapted to meet the needs of a wide variety of businesses which require pressure sensitive labels 40, 42 of different materials. The provision of such labels 40, 42 on a single form is highly desirable, as it permits different labels which are to go together to be printed with the same individualized material and then easily matched up when removed from the form 10 and applied where needed (for example, to a particular product having a particular serial number). This therefore virtually eliminated the possibility of losing one label of a set, or of confusing or misapplying labels of different sets. Since the subject matter printed on these labels 40, 42 often contains essential information that provides direction, or alerts an individual to safety concerns, eliminating lost or misapplied labels is no small advantage.

Further, these business forms 10 may readily and easily be manufactured in one continuous process using a minimum number of procedures. Still further, all of the procedures which are used in making these business forms 10 may be done at high speeds while still meeting precise tolerances for the produced forms 10. Accordingly, the cost of manufacture may be minimized.

Still further, these business forms 10 may be readily and precisely printed by the end business user who may need to add individualized information to each label like serial numbers identifying each product sold with the labels thereon. Besides proper orientation of the printing on the labels 40, 42 resulting from precise orientation of the labels 40, 42 on the liner 12, the printing itself may be readily and reliably accomplished in a variety of printers which may print both types of labels at once due to the even thickness across the business form 10. Overall, this will result in labels 40, 42 having an appearance of high quality. As previously noted, since synthetic labels 42 are often adhered directly to a product which is expected to be used for a long time (such as water heaters, etc.), the ability to avoid sloppy printing on those labels 42 in particular can assist in avoiding a negative commercial impression which might otherwise be formed by people who see the product and label over its long life. For homeowners faced with a need to replace an old appliance, it is conceivable that their impression on whether to replace that appliance with the same brand (which just failed them) could well be colored by the impression they get when looking at the old labels on the product.

These advantages are also obtained while avoiding the excess waste of ply and adhesive materials found in some prior art forms and while permitting the resulting forms to be stored much more compactly than could some other prior art forms.

Still other aspects, objects, and advantages of the present invention can be obtained from a study of the specification, the drawings, and the appended claims.

We claim:

1. A business form comprising:

a unitary sheet of release liner extending in a longitudinal direction and on one flat face defining adjacent first and second sides parallel to one another along the longitudinal direction;

a continuous first label ply, substantially the entirety of said first label ply being removably adhered to the first side of said release liner, said first label ply being made of a first material and having die cuts therein to define removable labels;

a first adhesive between said release liner and said first label ply to removably adhere said first label ply to said release liner;

a continuous second label ply, substantially the entirety of said second label ply being removably adhered to the second side of said release liner, said second label ply being made of a second material different than said first material and having die cuts therein to define removable labels; and a second adhesive between said second label ply and said release liner to removably adhere said second label ply to said release liner.

2. The business form of claim 1 wherein the first and second label plies are adhered to said release liner in a substantially parallel orientation with a gap therebetween.

3. The business form of claim 1 wherein said first label ply die cuts are spaced from said second label ply die cuts.

4. The business form of claim 1 wherein the first and second adhesives are both pressure sensitive adhesives.

5. The business form of claim 1 wherein the first material is paper and the second material is a synthetic material.

6. The business form of claim 1 wherein the first and second materials are different paper materials.

7. The business form of claim 1 wherein the first and second materials are different synthetic materials.

8. The business form of claim 1 wherein said second adhesive is different from said first adhesive and specially adapted for use with the second material of the second label ply.

9. The business form of claim 8 wherein the first material is paper and the second material is a synthetic material.

10. The business form of claim 8 wherein the first and second adhesives are both pressure sensitive adhesives.

11. The business form of claim 1 wherein said unitary sheet and said first and second label plies are all transversely separated to define separate individual business forms.

12. The business form of claim 11 wherein said unitary sheet and said first and second label plies are all transversely separated by perforations to define separate individual business forms.

13. The business form of claim 11 wherein said die cuts in at least one of said first and second label plies define multiple labels on each separate individual business form.

14. A business form made by the steps of:

a) providing a continuous release liner having a release face on one face thereof, said release liner further having first and second sides on said face, said first and second sides being substantially parallel to one another and extending in the continuous direction of the liner;

b) releasably adhering substantially the entirety of a continuous first label ply onto the first side of the liner release face;

c) providing a continuous second label ply having adhesive on one face thereof, said second label ply being a different material than said first label ply;

d) bringing substantially the entirety of said continuous second label ply into contact with the second side of the liner release face whereby said adhesive releasably adheres said liner to substantially the entirety of said second label ply; and e) die cutting labels in both said first and second label plies.

* * * * *